United States Patent
Kishiyama et al.

(10) Patent No.: US 11,818,064 B2
(45) Date of Patent: Nov. 14, 2023

(54) USER APPARATUS AND BASE STATION

(71) Applicant: NTT DOCOMO, INC., Tokyo (JP)

(72) Inventors: Yoshihisa Kishiyama, Tokyo (JP); Kiichi Tateishi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/569,580

(22) PCT Filed: Apr. 8, 2016

(86) PCT No.: PCT/JP2016/061553
§ 371 (c)(1),
(2) Date: Oct. 26, 2017

(87) PCT Pub. No.: WO2016/175015
PCT Pub. Date: Nov. 3, 2016

(65) Prior Publication Data
US 2018/0316468 A1 Nov. 1, 2018

(30) Foreign Application Priority Data

Apr. 28, 2015 (JP) ................................. 2015-092374

(51) Int. Cl.
*H04L 5/00* (2006.01)
*H04W 28/04* (2009.01)
(Continued)

(52) U.S. Cl.
CPC ......... *H04L 5/0048* (2013.01); *H04B 7/0617* (2013.01); *H04L 1/1812* (2013.01);
(Continued)

(58) Field of Classification Search
CPC ... H04L 5/0048; H04L 5/0092; H04L 5/0053; H04L 1/1812; H04L 5/0055; H04W 72/042; H04W 72/0446; H04B 7/0617
See application file for complete search history.

(56) References Cited

U.S. PATENT DOCUMENTS 9,185,668 B2   11/2015  Ji et al.
2007/0183519 A1*  8/2007  Dang ................. H04L 25/0236
                                                             375/260
(Continued)

FOREIGN PATENT DOCUMENTS

JP   2008-053864 A   3/2008
JP   2013-219507 A   10/2013
(Continued)

OTHER PUBLICATIONS

Extended European Search Report issued in the counterpart European Patent Application No. 16786292.9, dated Oct. 29, 2018 (8 pages).

(Continued)

*Primary Examiner* — Christine Ng
(74) *Attorney, Agent, or Firm* — Osha Bergman Watanabe & Burton LLP

(57) ABSTRACT

A user apparatus is provided. The user apparatus performs communications with a base station. The user apparatus includes a receiving unit configured to receive a downlink pilot signal, a downlink control signal, and downlink user data by using a subframe that includes a pilot signal area, to which the downlink pilot signal is mapped, a control signal area, to which the downlink control signal is mapped, a user data area, to which the downlink user data is mapped, and a multiple use area, to which an uplink signal or a downlink signal is mapped; and a transmission unit configured to map the uplink signal to the multiple use area and transmit the mapped result to the base station in the case where information is included in the downlink control signal indicating that the uplink signal is to be mapped to the multiple use area.

10 Claims, 10 Drawing Sheets

(51) Int. Cl.
*H04W 28/06* (2009.01)
*H04W 72/04* (2023.01)
*H04W 72/23* (2023.01)
*H04B 7/06* (2006.01)
*H04L 1/1812* (2023.01)
*H04W 72/0446* (2023.01)

(52) U.S. Cl.
CPC .......... *H04L 5/0053* (2013.01); *H04L 5/0055* (2013.01); *H04L 5/0092* (2013.01); *H04W 28/04* (2013.01); *H04W 28/06* (2013.01); *H04W 72/04* (2013.01); *H04W 72/0446* (2013.01); *H04W 72/23* (2023.01); *H04L 5/0023* (2013.01)

(56) References Cited

U.S. PATENT DOCUMENTS

| | | | | |
|---|---|---|---|---|
| 2008/0152029 | A1* | 6/2008 | Kwon | H04L 1/0072 375/260 |
| 2009/0060063 | A1* | 3/2009 | Guey | H04L 25/023 375/260 |
| 2011/0149813 | A1* | 6/2011 | Parkvall | H04W 72/0406 370/280 |
| 2012/0106501 | A1* | 5/2012 | Kishiyama | H04L 5/0048 370/329 |
| 2014/0334400 | A1 | 11/2014 | Chen et al. | |
| 2015/0043392 | A1* | 2/2015 | Susitaival | H04W 72/1205 370/280 |
| 2015/0117294 | A1* | 4/2015 | Li | H04W 72/042 370/312 |
| 2015/0358138 | A1* | 12/2015 | Hwang | H04W 74/004 370/280 |
| 2016/0112992 | A1* | 4/2016 | Bhushan | H04W 72/1257 370/330 |
| 2017/0048039 | A1* | 2/2017 | Zhao | H04L 25/0226 |
| 2018/0063820 | A1* | 3/2018 | Xiong | H04W 72/042 |

FOREIGN PATENT DOCUMENTS

| | | |
|---|---|---|
| JP | 2014-518052 A | 7/2014 |
| JP | 2015-073312 A | 4/2015 |
| WO | 2011063244 A2 | 5/2011 |
| WO | 2011063244 A3 | 7/2011 |
| WO | 2014/112377 A1 | 7/2014 |
| WO | 2014/182503 A2 | 11/2014 |

OTHER PUBLICATIONS

International Search Report issued in corresponding application No. PCT/JP2016/061553 dated Jul. 5, 2016 (4 pages).
Written Opinion of the International Searching Authority issued in corresponding application No. PCT/JP2016/061553 dated Jul. 5, 2016 (4 pages).
Office Action in counterpart Japanese Patent Application No. 2017-515464 dated Oct. 5, 2020 (5 pages).

\* cited by examiner

USER APPARATUS AND BASE STATION

BACKGROUND OF THE INVENTION

1. Field of the Invention

The present invention relates to a user apparatus and a base station.

2. Description of the Related Art

In LTE (Long Term Evolution), the fifth generation wireless technologies have been discussed in order to realize further larger system capacity, further higher data transmission speed, further lower data transmission latency or the like.

For example, as an element technology in the fifth generation wireless technologies, a technology called "massive MIMO" is drawing attention, in which, in order to effectively use a high frequency band, a lot of antenna elements (e.g., 100 elements) are installed in a base station to perform beam forming with a narrow beam width.

By using the massive MIMO, it is possible to concentrate electric field strength in a narrow area, and thus, it is possible to reduce interference between user apparatuses. Further, by introducing the massive MIMO, it is possible to secure a coverage of a high frequency band by the beam forming, to improve frequency utilization efficiency by performing beam forming simultaneously for multiple user apparatuses, etc.

CITATION LIST

Patent Literature

[PTL 1] Japanese Unexamined Patent Application Publication No. 2013-219507

SUMMARY OF THE INVENTION

Technical Problem

In order to realize further lower latency in the fifth generation wireless technologies, for example, it is considered to be desirable that a wireless interface is used in which a faster ACK/NACK transmission timing according to HARQ (hybrid automatic repeat-request) is available while making a TTI (transmission time interval) shorter than the TTI in a conventional LTE system.

Further, in the fifth generation wireless technologies, it is assumed to accommodate massive user apparatuses that perform communications such as MTC (Machine-Type Communications), for which communication speed is not so required. Therefore, in order to reduce overhead related to ACK/NACK transmission according to HARQ, it is desirable that a wireless interface is used in which ACK/NACK transmission timings and transmission resources can be changed flexibly.

Further, in the above-described massive MIMO, a lot of beams are transmitted to multiple user apparatuses at the same time. Therefore, it is desirable that a wireless interface is used between a base station and a user apparatus in which a lot of communication channels can be multiplexed. Further, in the massive MIMO, the beams used for communications and the base stations (sites) that transmit the beams are switched as necessary in accordance with the movement of the user apparatuses. Therefore, it is desirable that a wireless interface is used in which it is possible for the user apparatus to be immediately synchronized with a wireless signal (a beam after the switching) in accordance with the switching.

The present invention has been made in view of the above. An object of the present invention is to provide a technology in which a wireless frame structure can be changed flexibly in a minimum scheduling unit, or TTI.

Solution to Problem

A user apparatus according to an embodiment is provided. The user apparatus performs communications with a base station. The user apparatus includes a receiving unit configured to receive a downlink pilot signal, a downlink control signal, and downlink user data according to a subframe that includes a pilot signal area, to which the downlink pilot signal is mapped, a control signal area, to which the downlink control signal is mapped, a user data area, to which the downlink user data is mapped, and a multiple use area, to which an uplink signal or a downlink signal is mapped; and a transmission unit configured to map the uplink signal to the multiple use area and transmit the mapped result to the base station in the case where information is included in the downlink control signal indicating that the uplink signal is to be mapped to the multiple use area.

Further, a base station according to an embodiment is provided. The base station performs communications with a user apparatus. The base station includes a control unit configured to control which of a downlink signal and an uplink signal is to be mapped to a multiple use area to which the uplink signal or the downlink signal is mapped; and a transmission unit configured to transmit a downlink pilot signal, a downlink control signal, and downlink user data by using a subframe that includes a pilot signal area, to which the downlink pilot signal is mapped, a control signal area, to which the downlink control signal is mapped, a user data area, to which the downlink user data is mapped, and the multiple use area in the case where the uplink signal is mapped to the multiple use area.

Advantageous Effects of Invention

According to an embodiment, a technology is provided in which a wireless frame structure can be changed flexibly in a minimum scheduling unit, or TTI.

DETAILED DESCRIPTION OF THE PREFERRED EMBODIMENTS

Figure 1:
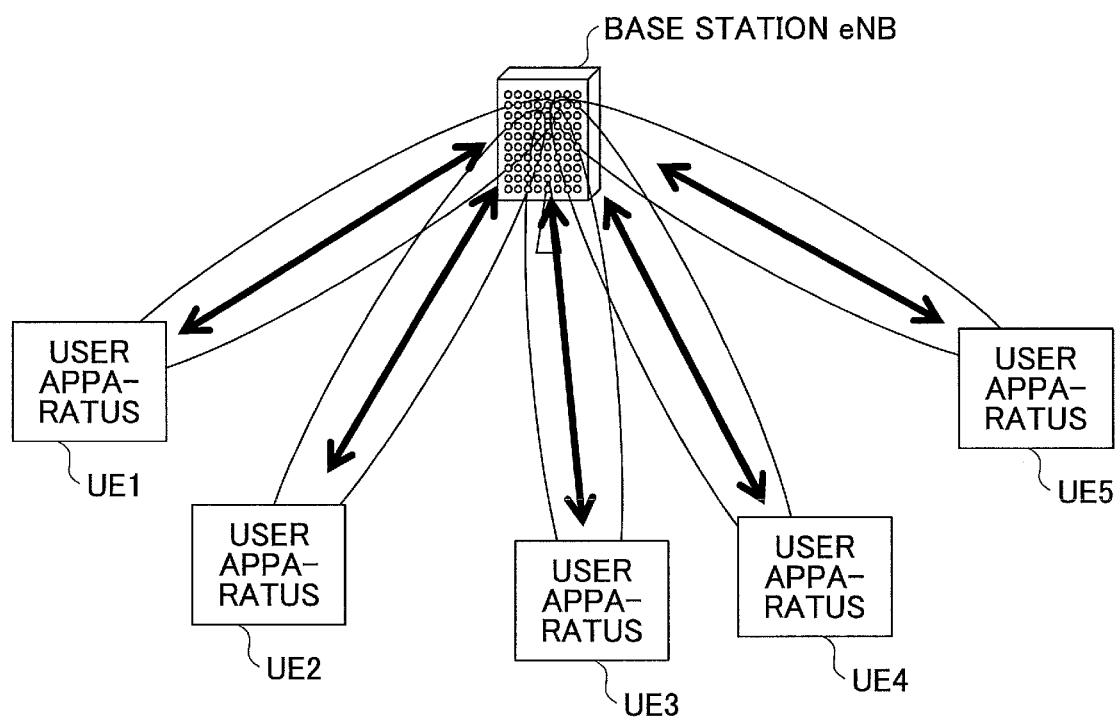
FIG. 1 is a drawing illustrating a structure of a wireless communication system according to an embodiment.

In the following, referring to the drawings, embodiments of the present invention will be described. It should be noted that the embodiments described below are merely examples and the embodiments to which the present invention is applied are not limited to the following embodiments. For example, it is assumed that a wireless communication system according to an embodiment complies with LTE standard. However, the present invention can be applied, not only to LTE, but also to other schemes. It should be noted that, in the application specification and claims, the term "LTE" is used in a broader sense, not only for meaning a communication method corresponding to 3GPP release 8 or 9, but also for including a communication method corresponding to 3GPP release 10, 11, 12, 13, or a fifth generation communication method corresponding to release 14 or later. Further, in the application specification and claims, it is intended that the term "pilot signal" means a signal similar to a reference signal in LTE. Further, in the application specification and claims, similar to the conventional LTE, descriptions are written by assuming that a minimum scheduling unit, TTI is the same as, but not limited to, a subframe. An embodiment can be applied to any wireless frame as long as the wireless frame include a minimum scheduling unit, TTI.

<Overview>

FIG. 1 is a drawing illustrating a structure of a wireless communication system according to an embodiment. As illustrated in FIG. 1, the wireless communication system includes multiple user apparatuses UE and a base station eNB. Further, in an example of FIG. 1, five user apparatuses UE1 to UE 5 are illustrated for the sake of drawing convenience. There is no limitation for the number of user apparatuses. It should be noted that, in the following descriptions, any one of the user apparatuses UE1 to UE 5 will be referred to as "user apparatus UE". Further, in the example of FIG. 1, a single base station eNB is illustrated. However, multiple base stations eNB may be included.

The user apparatus UE has a function for performing communications with the base station eNB via radio. The user apparatus UE may be, for example, a mobile phone, a smartphone, a tablet, a mobile router, and a wearable terminal. The user apparatus UE may be any apparatus as long as it has a communication function. The user apparatus UE includes hardware resources such as a CPU including a processor, a memory apparatus including a ROM, a RAM, a flash memory, etc., an antenna used for communications with the base station eNB, an RF (Radio Frequency) apparatus, etc. Functions and processes of the user apparatus UE may be realized by having data or programs, stored in the memory apparatus, processed by the processor. However, the hardware configuration of the user apparatus UE is not limited to the above, and the user apparatus UE may have any other appropriate hardware configuration.

The base station eNB performs communications with the user apparatus UE via radio. The base station eNB includes hardware resources such as a CPU including a processor, a memory device including a ROM, a RAM, a flash memory, etc., an antenna used for communications with the user apparatus UE, etc., a communication interface apparatus for communicating with an adjacent base station eNB, a core network, etc. Functions and processes of the base station eNB may be realized by having data or programs, stored in the memory apparatus, processed by the processor. However, the hardware configuration of the base station eNB is not limited to the above, and the base station eNB may have any other appropriate hardware configuration. The base station eNB may include RRE (remote radio equipment) that is connected to the base station eNB via an optical fiber, etc.

The base station eNB has a massive MIMO function, and is capable of forming multiple beams. "To form multiple beams" means, for example, to perform beam forming by multiplying a weight with a transmission signal for each of the multiple antenna ports so that a wireless signal is transmitted by using multiple beams with a certain width.

The base station eNB forms multiple beams. The user apparatuses UE1 to UE5 receive a signal according to corresponding beams. Further, the base station eNB switches appropriate beams for a user apparatus UE as necessary according to the movement of the user apparatus UE. The base station eNB transmits and receives various kinds of signals including a pilot signal, a control signal, user data, an HARQ ACK/NACK to and from each of the user apparatuses UE by using a beam corresponding to the user apparatus UE. It should be noted that, in the example of FIG. 1, it is illustrated that a single user apparatus UE corresponds to a beam for the sake of convenience. Multiple user apparatuses UE may correspond to the same beam depending on positions of the user apparatuses UE.

In a wireless communication system according to an embodiment, a wireless frame structure is used, which structure includes, within the same subframe, a pilot signal area, to which a downlink pilot signal is mapped; a control signal area, to which a downlink control signal is mapped; a user data area, to which downlink user data is mapped; and a multiple use area, to which any uplink signal or any downlink signal is mapped (hereinafter, referred to as "multiple use area"), and, which structure is capable of indicating contents of a signal that is mapped to the multiple use area by using the control signal. It should be noted that it is possible for the wireless frame structure to map an uplink signal to the multiple use area. Therefore, it may be said that a wireless communication system according to an embodiment supports dynamic TDD (Time Division Duplex) communications in which the downlink and the uplink can be switched at any timing.

<Functional Structure>

(Base Station)

Figure 2:
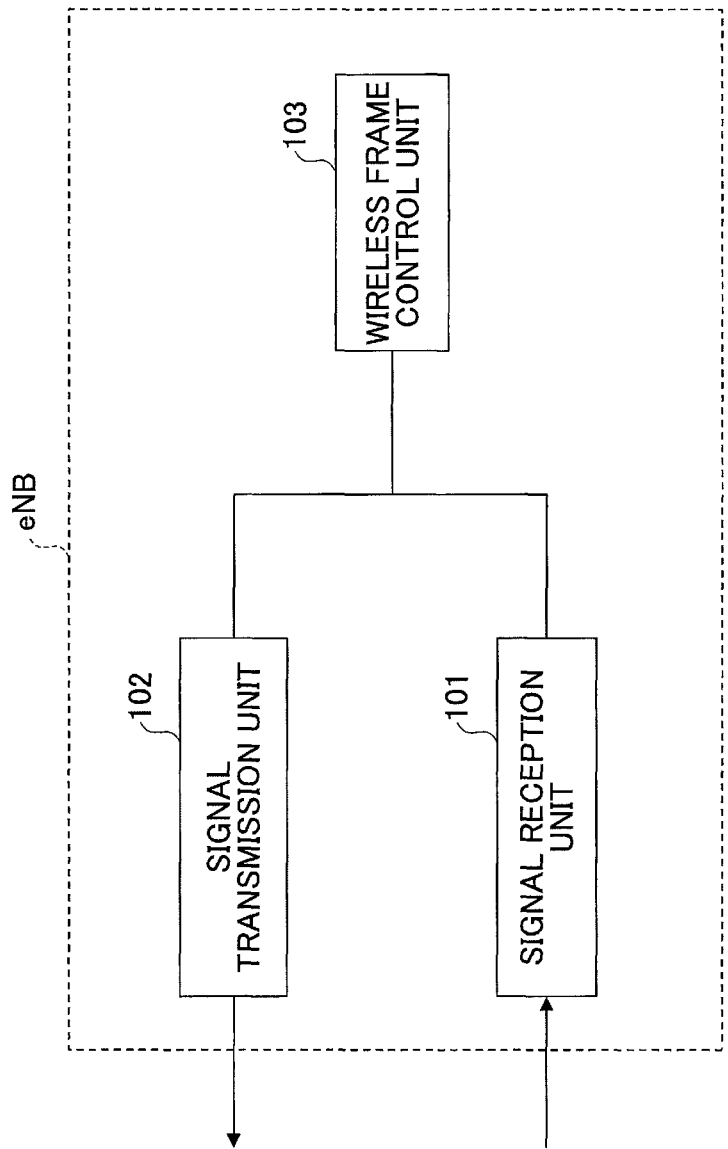
FIG. 2 is a drawing illustrating an example of a functional structure of a base station according to an embodiment.

FIG. 2 is a drawing illustrating an example of a functional configuration of a base station eNB according to an embodiment. As illustrated in FIG. 2, the base station eNB includes a signal reception unit 101, a signal transmission unit 102, and a wireless frame control unit 103. FIG. 2 illustrates functional units of the base station eNB especially related to an embodiment only, and thus, the base station eNB further includes at least functions for performing operations according to LTE (not shown in the figure). Further, a functional structure illustrated in FIG. 2 is merely an example. Functional classification and names of functional units may be anything as long as operations related to an embodiment can be performed.

The signal reception unit 101 has a function for receiving a signal including a wireless frame structure according to an embodiment, and obtains upper layer information from a lower layer signal.

The signal transmission unit 102 generates a lower layer signal from upper layer information, and transmits the generated signal via radio. Further, the signal transmission unit 102 has a function for generating a wireless signal including a pilot signal area, to which a downlink pilot signal is mapped; a control signal area, to which a downlink control signal is mapped; a user data area, to which downlink user data is mapped; and a multiple use area within the same subframe, and transmitting the generated signal to the user apparatus UE. Further, the signal transmission unit 102 has a function for transmitting wireless signals with different TTI lengths in the frequency axis as necessary.

The wireless frame control unit 103 determines, for each subframe, a type and contents of a wireless signal that is mapped to the multiple use area. Further, the wireless frame control unit 103 includes information (hereinafter, referred to as "use information") indicating the type and contents of the wireless signal that is mapped (is to be mapped) to the multiple use area in a control signal in the subframe that includes the multiple use area, and transmits the included result to the user apparatus UE via the signal transmission unit 102. It should be noted that the use information is transmitted to each user apparatus UE. Further, although the term "use information" is used in the following descriptions for the sake of convenience, the use information may be a kind of control information included in the control signal (e.g., DCI (Downlink Control Information)).

(User Apparatus)

Figure 3:
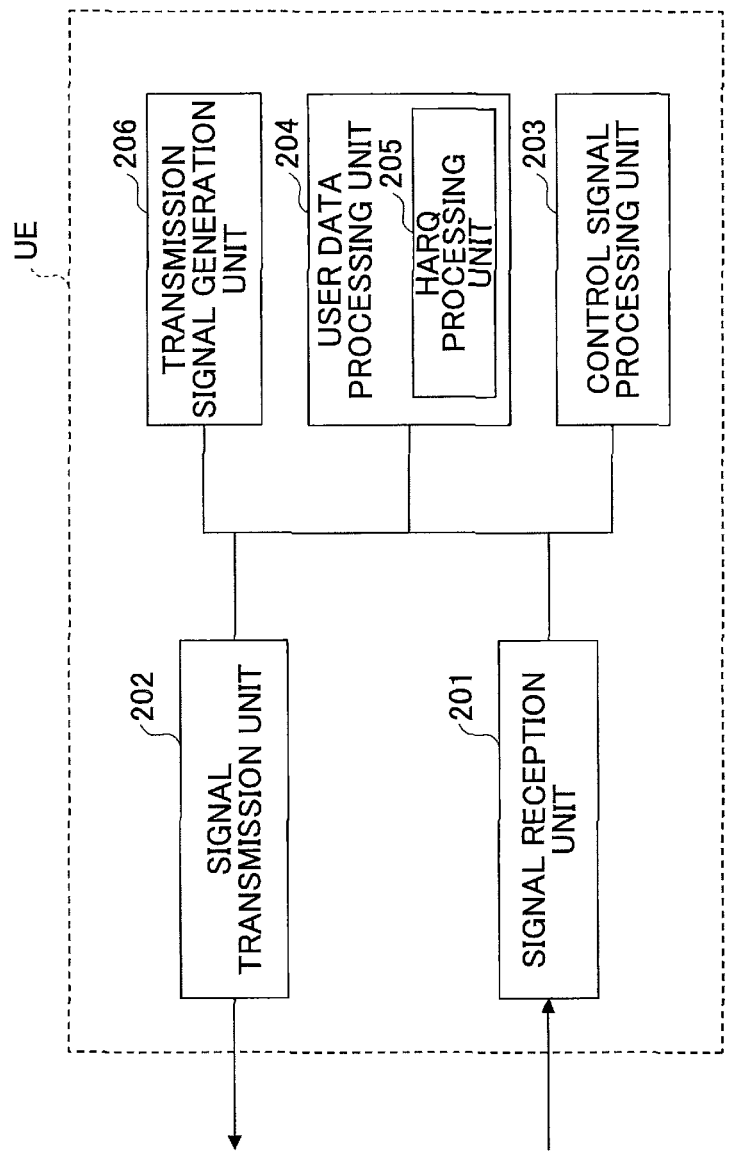
FIG. 3 is a drawing illustrating an example of a functional structure of a user apparatus according to an embodiment.

FIG. 3 is a drawing illustrating an example of a functional structure of a user apparatus UE according to an embodiment. As illustrated in FIG. 3, the user apparatus UE includes a signal reception unit 201, a signal transmission unit 202, a control signal processing unit 203, a user data processing unit 204, an HARQ processing unit 205, and a transmission signal generation unit 206. FIG. 3 illustrates functional units of the user apparatus UE especially related to an embodiment only, and thus, the user apparatus UE further includes at least functions for performing operations according to LTE (not shown in the figure). Further, a functional structure illustrated in FIG. 3 is merely an example. Functional classification and names of functional units may be anything as long as operations related to an embodiment can be performed.

The signal reception unit 201 has a function for receiving a wireless signal including a pilot signal area, to which a downlink pilot signal is mapped; a control signal area, to which a downlink control signal is mapped; a user data area, to which downlink user data is mapped; and a multiple use area within the same subframe. Further, the signal reception unit 201 has a function for receiving wireless signals with different TTIs (lengths) in the frequency axis direction. Further, the signal reception unit 201 has a function for demodulating various kinds of signals included in the control signal area, the user data area, and the multiple use area by using the pilot signal.

The signal transmission unit 202 has a function for generating a lower layer signal from upper layer information according to an indication from the HARQ processing unit 205 or the transmission signal generation unit 206, and for transmitting the generated signal to the base station eNB by using a resource of the multiple use area.

The control signal processing unit 203 has a function for performing various kinds of processes based on the control signal received by the signal reception unit 201. Further, the control signal processing unit 203 obtains a type and contents of a wireless signal that is mapped (or, is to be mapped) to the multiple use area within the same subframe based on the use information included in the control signal, and transmits the obtained result to the user data processing unit 204 or the transmission signal generation unit 206.

The user data processing unit 204 obtains user data for the user apparatus UE, which data is mapped to the user data area, and performs various kinds of processes. Further, in the case where the user data is mapped to the multiple use area, the user data processing unit 204 obtains the user data for the user apparatus UE, which data has been mapped to the user data area, and performs various kinds of processes.

The HARQ processing unit 205 performs HARQ processing by determining whether the user data is correctly decoded, and transmitting the determined result (ACK/NACK) to the base station eNB. It should be noted that the HARQ processing unit 205 is included in the user data processing unit 204. The ACK/NACK is transmitted to the transmission signal generation unit 206, and transmitted to the base station eNB via the signal transmission unit 202.

The transmission signal generation unit 206 generates an uplink signal that is mapped to the multiple use area according to an indication from the control signal processing unit 203 or the HARQ processing unit 205, and transmits the generated uplink signal to the base station eNB via the signal transmission unit 202.

The above-described functional structures of the user apparatus UE and the base station eNB may be entirely realized by a hardware circuit (e.g., one or more IC chips), or may be partially realized by a hardware circuit and the remaining part may be realized by a CPU and programs.

(Base Station)

Figure 4:
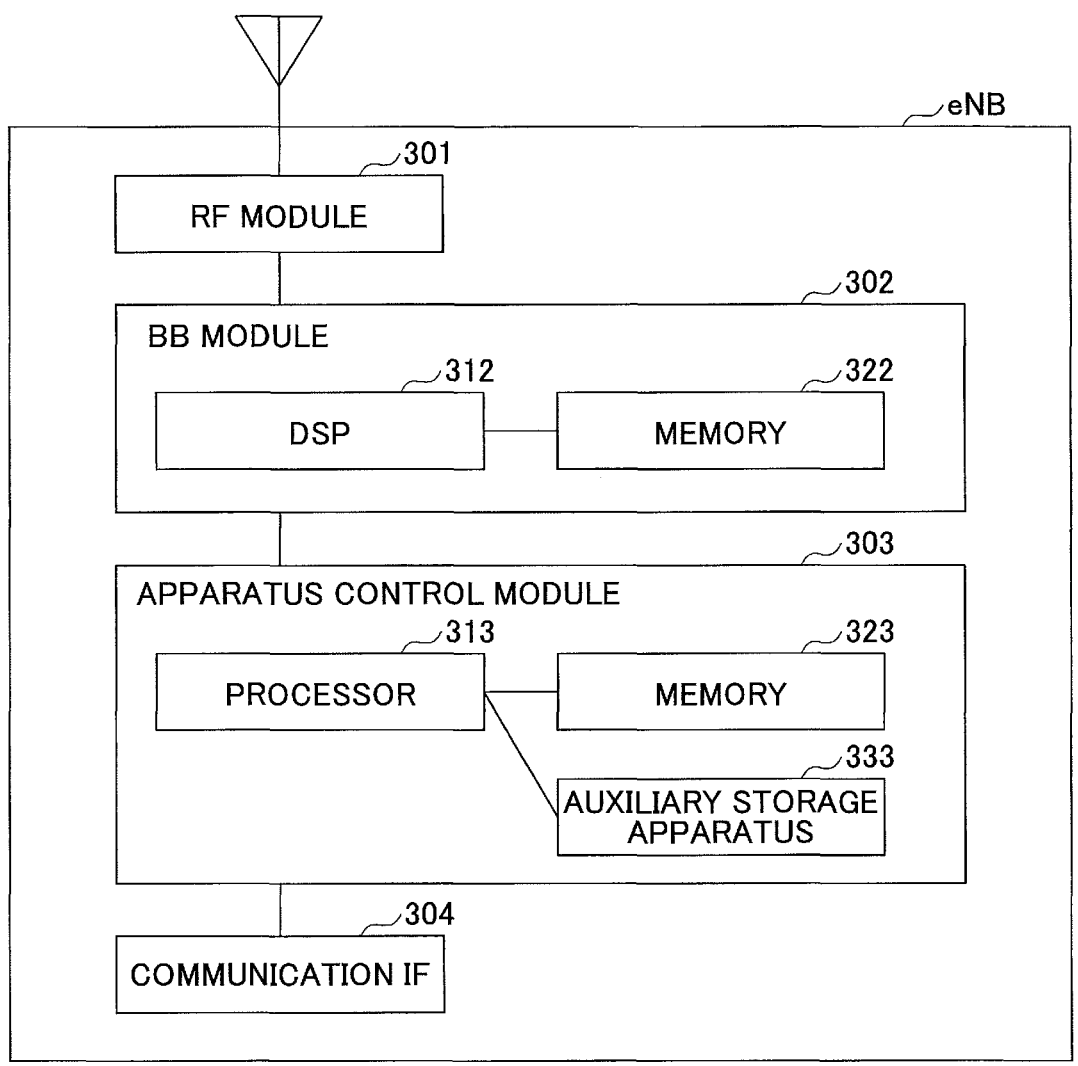
FIG. 4 is a drawing illustrating an example of a hardware configuration of the base station.

FIG. 4 is a drawing illustrating an example of a hardware configuration of a base station eNB according to an embodiment. FIG. 4 illustrates a structure closer to an implementation example compared to FIG. 2. As illustrated in FIG. 4, the base station eNB includes an RF (Radio Frequency) module 301 for performing a process related to a wireless signal, a BB (Base Band) module 302 for performing baseband signal processing, an apparatus control module 303 for performing a process of an upper layer, etc., and a communication IF 304 that is an interface for connecting to a network.

The RF module 301 generates a wireless signal to be transmitted from an antenna by performing D/A (digital-to-analog) conversion, modulation, frequency conversion, power amplification, etc., for a digital baseband signal received from the BB module 302. Further, the RF module 301 generates a digital baseband signal by performing frequency conversion, A/D (analog to digital) conversion, demodulation, etc., for a received wireless signal, and transmits the generated signal to the BB module 302. The RF module 301 includes, for example, a part of the signal reception unit 101 and a part of the signal transmission unit 102 illustrated in FIG. 2.

The BB module 302 performs a process of converting bidirectionally between an IP packet and a digital baseband signal. A DSP (digital signal processor) 312 is a processor for performing signal processing in the BB module 302. A memory 322 is used as a work area of the DSP 312. The BB module 302 includes, for example, a part of the signal reception unit 101, a part of the signal transmission unit 102, and the wireless frame control unit 103 illustrated in FIG. 2.

The apparatus control module 303 performs an IP layer protocol process, an OAM (operation and maintenance) process, etc. A processor 313 performs a process for the apparatus control module 303. A memory 323 is used as a work area of the processor 313. An auxiliary storage apparatus 333 is, for example, a HDD, etc., and stores various types of setting information items, etc., used for operations of the base station eNB.

(User Apparatus)

Figure 5:
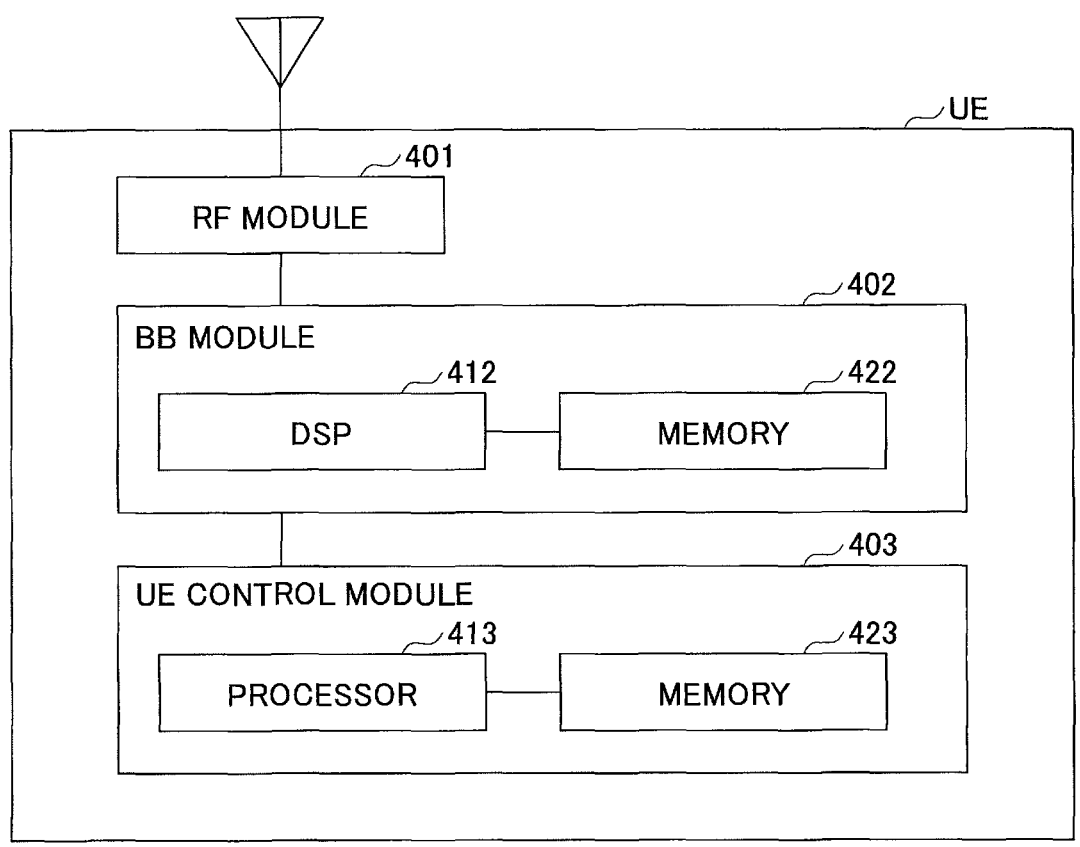
FIG. 5 is a drawing illustrating an example of a hardware configuration of the user apparatus.

FIG. 5 is a drawing illustrating an example of a hardware configuration of a user apparatus UE according to an embodiment. FIG. 5 illustrates a structure closer to an implementation example compared to FIG. 3. As illustrated in FIG. 5, the user apparatus UE includes an RF module 401 for performing a process related to a wireless signal, a BB module 402 for performing baseband signal processing, and a UE control module 403 for performing processes of an upper layer, etc.

The RF module 401 generates a wireless signal to be transmitted from an antenna by performing D/A conversion, modulation, frequency conversion, power amplification, etc., for a digital baseband signal received from the BB module 402. Further, the RF module 401 generates a digital baseband signal by performing frequency conversion, A/D conversion, demodulation, etc., for a received wireless signal, and transmits the generated signal to the BB module 402. The RF module 401 includes, for example, a part of the signal reception unit 201 and a part of the signal transmission unit 202 illustrated in FIG. 3.

The BB module 402 performs a process of converting bidirectionally between an IP packet and a digital baseband signal. A DSP 412 is a processor for performing signal processing in the BB module 402. A memory 422 is used as a work area of the DSP 412. The BB module 402 includes, for example, a part of the signal reception unit 201, a part of the signal transmission unit 202, the control signal processing unit 203, a part of the user data processing unit 204, the HARQ processing unit 205, and the transmission signal generation unit 206 illustrated in FIG. 3.

The UE control module 403 performs an IP layer protocol process, processes of various types of applications, etc. A processor 413 performs a process for the UE control module 403. A memory 423 is used as a work area of the processor 413. The UE control module 403 includes, for example, a part of the user data processing unit 204 illustrated in FIG. 3.

<Processing Steps>

(Regarding Wireless Frame Structure)

Figure 6:
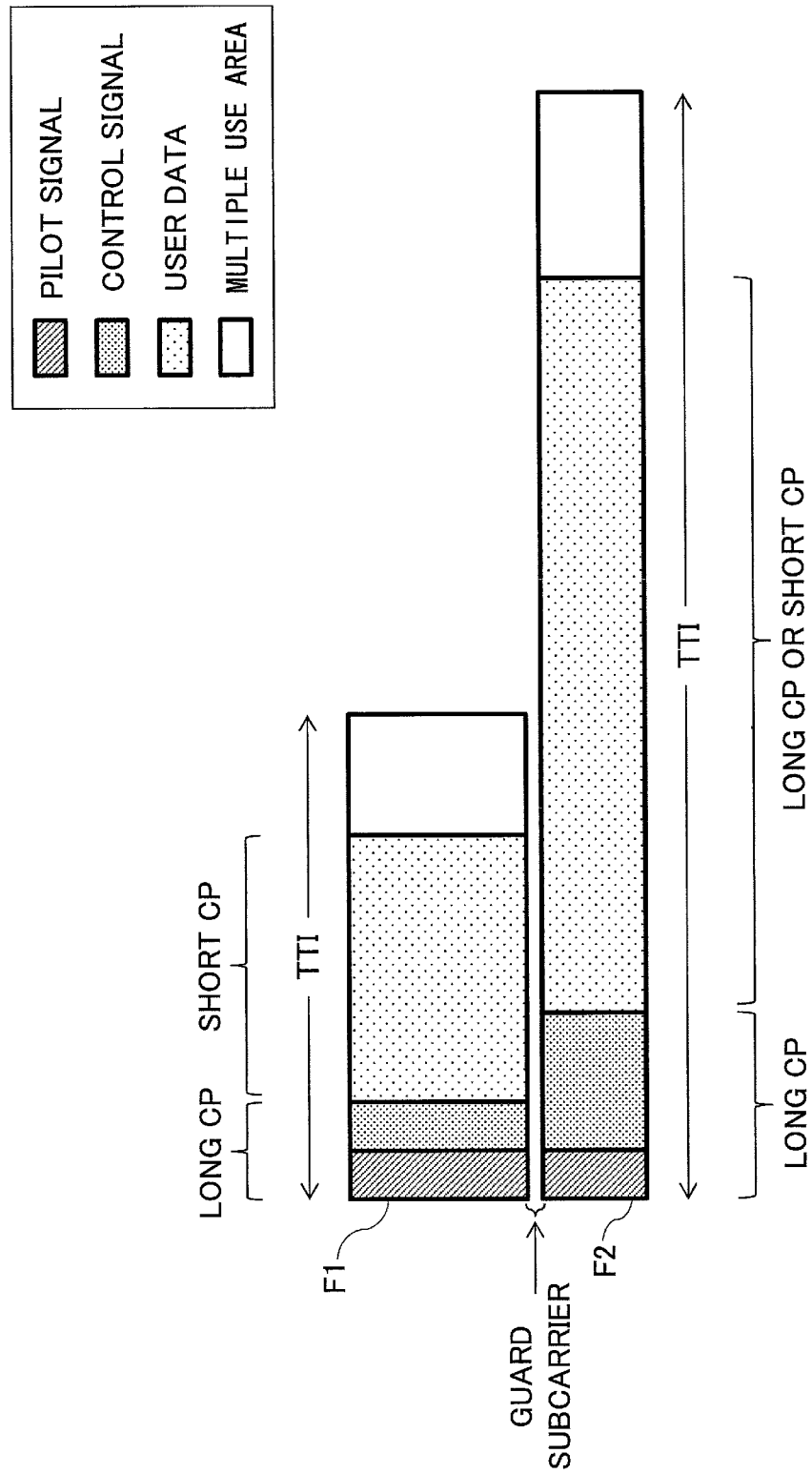
FIG. 6 is a drawing illustrating an example of a downlink signal wireless frame structure.

FIG. 6 is a drawing illustrating an example of a downlink signal wireless frame structure. The wireless frame used in a wireless communication system according to an embodiment includes a pilot signal area, to which a downlink pilot signal is mapped; a control signal area, to which a downlink control signal is mapped; a user data area, to which downlink user data is mapped; and a multiple use area within the same subframe.

The pilot signal area, the control signal area, the user data area, and the multiple use area include one or more OFDM symbols. The number of OFDM symbols included in the control signal area, the user data area, and the multiple use area is not limited. Further, the number of OFDM symbols included in the control signal area, the user data area, and the multiple use area may be specified by, for example, a physical channel such as a PCFICH (Physical Control Format Indicator Channel).

The pilot signal, which is mapped to the pilot signal area, corresponds to a reference signal in LTE. The signal reception unit 201 of the user apparatus UE demodulates the control signal area, the user data area, and the multiple use area by using the pilot signal. More specifically, the signal reception unit 201 of the user apparatus UE demodulates the control signal area, the user data area, and the multiple use area by using a channel estimate value obtained from the pilot signal.

The control signal, which is mapped to the control signal area, is a signal like DCI which includes various kinds of control information items such as schedule information in the user data area, a UL grant, etc. Further, according to an embodiment, the control signal includes use information indicating a type, contents, etc., of a wireless signal that is mapped (or, is to be mapped) to the multiple use area within the same subframe. It should be noted that the use information may be a part of the various kinds of control information items.

The user data, which is mapped to the user data area, is, for example, C-plane data and U-plane data. Further, user data for multiple user apparatuses UE is mapped to the user data area, which is similar to the PDSCH (Physical Downlink Shared Channel).

The multiple use area is an area to which any uplink signal or any downlink signal can be mapped.

The wireless frame used in a wireless communication system according to an embodiment includes a pilot signal area at the beginning of the wireless frame (subframe). With the above arrangement, it is possible for the signal reception unit 201 of the user apparatus UE to perform demodulation processing according to a rough reception timing synchronization in the case of demodulation of the pilot signal area and the control signal area, and to perform demodulation processing in the case of demodulation of the user data area after having performed accurate reception timing synchronization by using the received pilot signal. Further, even in the case where the beams used for communications or the base stations eNB (site) that transmit the beams are switched, it is possible for the user apparatus UE to immediately perform synchronization by using the pilot signal at the beginning of the wireless frame (subframe) of the beam after the switching, and to demodulate resources of the user data area by using a more accurate synchronization timing when demodulating the user data area.

Further, the wireless frame used in a wireless communication system according to an embodiment may have any TTI length. Further, a wireless frame with a short TTI (e.g., F1 in FIG. 6) and a wireless frame with a long TTI (e.g., F2 in FIG. 6) may be multiplexed in the frequency domain. With the above arrangement, it is possible for a wireless communication system according to an embodiment to use a wireless frame with a short TTI for communications in which low latency is required, and to use a wireless frame with a long TTI for communications in which coverage is required. In other words, it is possible for a wireless communication system according to an embodiment to control the TTI length in various ways according to the usage of communications.

Further, in the case where a wireless frame with a short TTI and a wireless frame with a long TTI are multiplexed in the frequency domain, a non-communication subcarrier (hereinafter, referred to as "guard subcarrier") may be included between the wireless frames. With the above arrangement, in the case where wireless frames with different TTI lengths are multiplexed, it is possible to remove, for example, influence of frequency shifting due to a Doppler effect and to secure reception quality of each of the wireless frames.

Further, in a wireless frame used in a wireless communication system according to an embodiment, the length of a cyclic prefix (hereinafter, referred to as "CP") of each OFDM symbol included in the pilot signal area and/or the control signal area may be greater than the length of a CP of each OFDM symbol included in the user data area.

A signal of the user data area is not influenced a lot by a delay wave because the signal is transmitted by using a specific narrow beam. Therefore, it is possible to have the length of a CP of the user data area relatively short. On the other hand, as details will be described later, in the pilot signal area and the control signal area, pilot signals and control signals associated with multiple beams (multiple antenna ports) are multiplexed in the frequency direction (or, in the frequency direction and with respect to spreading codes). Further, the pilot signals and the control signals are important because the pilot signals and the control signals are used for demodulating the user data area. Therefore, the CP length of the pilot signal area or the control signal area may be greater than the CP length of each OFDM symbol included in the user data area. With the above arrangement, for example, it is possible to remove influence of a delay wave, etc., in a surer way and it is possible for the user apparatus UE to receive pilot signals and control signals in a stable way.

It should be noted that it is assumed that a wireless frame with a long TTI (e.g., F2 in FIG. 6) is used in relatively low rate communications, and thus, the CP length of each OFDM symbol included in the user data area may be set relatively long.

Further, the CP length of each OFDM symbol included in the user data area may be reported to the user apparatus UE by using the use information. Further, information indicating the CP length set in the user data area may be a bit of information indicating whether the CP length is long or short. With the above arrangement, it is possible for the base station eNB to control the CP length of the user data area in various ways.

(Regarding Multiplexing Structure and Demodulation Processing)

Figure 7:
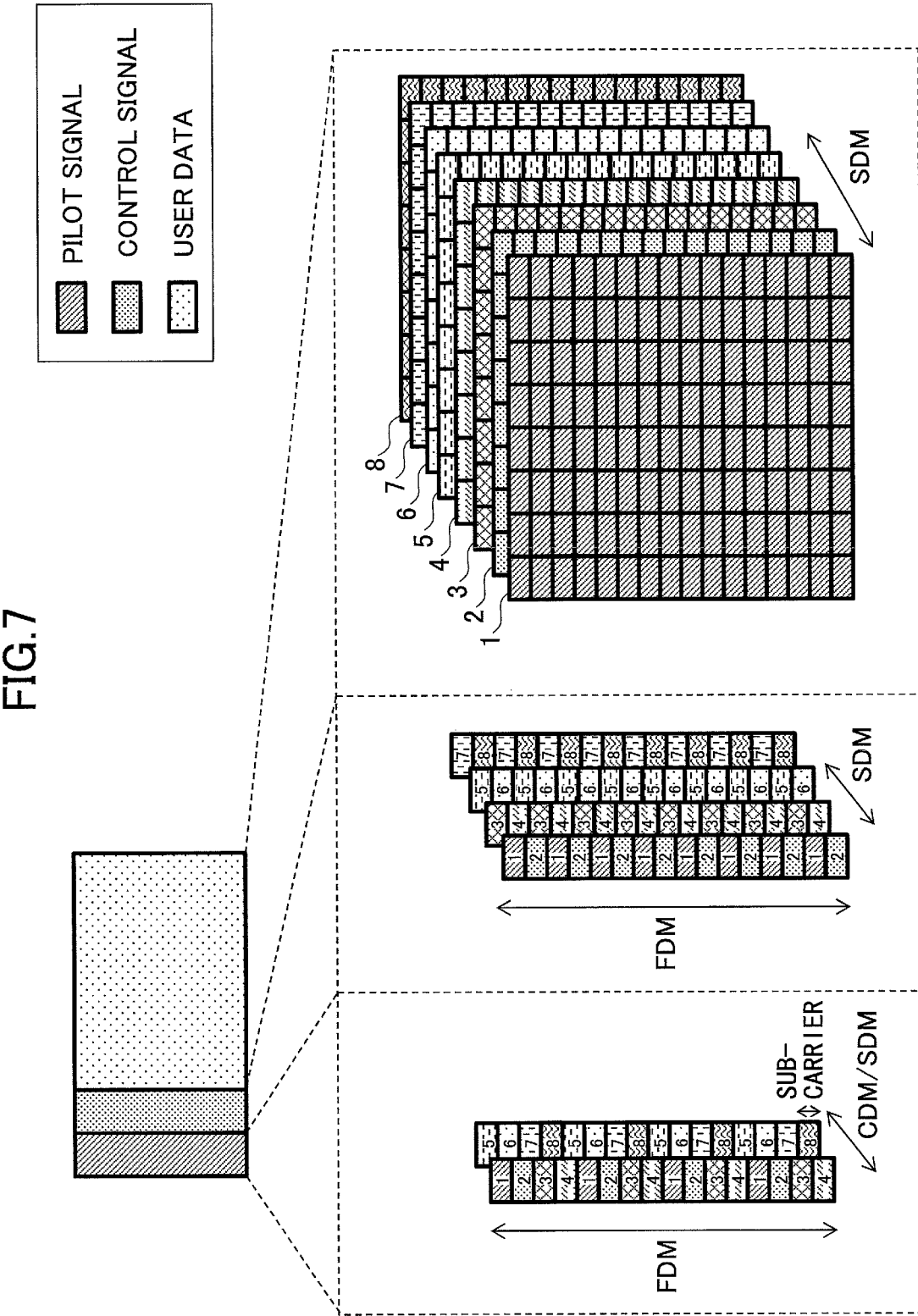
FIG. 7 is a drawing illustrating an example of a multiplexing structure of the downlink signal wireless frame.

FIG. 7 is a drawing illustrating an example of a multiplexing structure of the downlink signal wireless frame. Referring to FIG. 7, multiplexing methods of signals and processing steps for demodulation of the wireless frame will be described. It should be noted that, for example, although a single subcarrier is indicated in vertical axis of each block in FIG. 7, multiple subcarriers may be included. For example, although a single OFDM symbol is indicated in each block in the horizontal axis, multiple OFDM symbols may be included in a block.

[Multiplexing Structure]

In the pilot signal area, different pilot signals (pilot signals associated with corresponding different beams) are repeatedly multiplexed several times in the frequency direction. For example, in FIG. 7, pilot signals indicated in blocks "1" to "4" and pilot signals indicated in blocks "5" to "8" are repeatedly multiplexed in the frequency direction. It should be noted that the pilot signals indicated in the block "1" mean pilot signals transmitted by using the same beam (the same antenna port). The same meaning is applied to the pilot signals indicated in the blocks "2" to "8".

Further, the pilot signal area may be multiplexed by using Space Division Multiplexing (SDM) and/or Code Division Multiplexing (CDM) within the same subcarrier. "The pilot signal area is multiplexed by using Space Division Multiplexing" means that pilot signals are transmitted from the signal transmission unit 102 of the base station eNB by using different beams (different antenna ports) of the same subcarrier. "The pilot signal area is multiplexed by using Code Division Multiplexing" means that different spreading codes are assigned to the corresponding pilot signals, and the signals are transmitted from the signal transmission unit 102 of the base station eNB within the same subcarrier. In an example of FIG. 7, two different pilot signals (blocks "1" and "5", blocks "2" and "6", blocks "3" and "7", or blocks "4" and "8") are multiplexed within the same frequency (subcarrier).

In the pilot signal area, different control signals (control signals associated with corresponding different beams) are repeatedly multiplexed several times in the frequency direction. For example, in FIG. 7, control signals indicated in blocks "1" and "2", control signals indicated in blocks "3" and "4", control signals indicated in blocks "5" and "6", or, control signals indicated in blocks "7" and "8" are repeatedly multiplexed in the frequency direction. It should be noted that the control signals indicated in the block "1" mean control signals transmitted by using the same beam (the same antenna port). The same meaning is applied to the control signals indicated in the blocks "2" to "8".

Further, the control signal area may be multiplexed by using Space Division Multiplexing within the same subcarrier. "The control signal area is multiplexed by using Space Division Multiplexing" means that control signals are transmitted from the signal transmission unit 102 of the base station eNB within the same subcarrier by using different beams (different antenna ports). In an example of FIG. 7, four different control signals (blocks "1", "3", "5", and "7", or, blocks "2", "4", "6", and "8") are multiplexed within the same frequency (subcarrier).

In the user data area, user data sets are multiplexed by using Space Division Multiplexing within the same subcarrier. "The user data area is multiplexed by using Space Division Multiplexing" means that user data sets are transmitted from the signal transmission unit 102 of the base station eNB within the same subcarrier by using different beams (different antenna ports). In an example of FIG. 7, eight different control signals (blocks "1", "2", "3", "5", "8", "7", and "8") are multiplexed within the same frequency (subcarrier).

[Processing Steps of Demodulation Processing]

The signal reception unit 201 of the user apparatus UE demodulates the control signal area, the user data area, and the multiple use area to which user data is mapped, by using a channel estimate value obtained from the pilot signal.

More specifically, when demodulating the control signal in a predetermined resource and the user data in a predetermined resource, the signal reception unit 201 of the user apparatus UE uses a channel estimate value obtained from a pilot signal corresponding to the predetermined resource.

Here, according to an embodiment, the control signal in the predetermined resource and the data in the predetermined resource are associated in advance with a pilot signal that is used for demodulation.

A specific example will be described while making reference to FIG. 7. For example, a control signal that is assigned to the block "1" in the control signal area; and user data that is assigned to the block "1" in the user data area are associated in advance with a pilot signal that is assigned to the block "1" in the pilot signal area. Similarly, a control signal that is assigned to the block "2" in the control signal area; and user data that is assigned to the block "2" in the user data area are associated in advance with a pilot signal that is assigned to the block "2" in the pilot signal area. The same association will be applied to the blocks "3" to "8". In the following, processing steps of specific demodulation processing performed by the signal reception unit 201 of the user apparatus UE will be described.

First, in the case where the pilot signals are multiplexed by using Code Division Multiplexing, the signal reception unit 201 of the user apparatus UE obtains a specific pilot signal of the pilot signals included within the same subcarrier by using a spreading code obtained in advance. It should be noted that, in the case where the pilot signals are multiplexed by using Space Division Multiplexing (that is, in the case where the pilot signals are transmitted by using different beams), the signal reception unit 201 of the user apparatus UE obtains a pilot signal, of the pilot signals multiplexed by using Space Division Multiplexing, included in the beam received by the user apparatus UE (the beam directed to the user apparatus UE)

Next, the signal reception unit 201 of the user apparatus UE tries to demodulate a predetermined resource of the control signal area, associated in advance with the pilot signal, by using the obtained pilot signal. Here, the control signal area is multiplexed by using Space Division Multiplexing within the same subcarrier. That is, the signal reception unit 201 of the user apparatus UE cannot determine which beam has been used for outputting the received control signal, of the control signals in the predetermined subcarrier. In other words, the signal reception unit 201 of the user apparatus UE cannot determine which pilot signal should be used for demodulation processing.

Therefore, the signal reception unit 201 of the user apparatus UE obtains control signals by repeatedly performing blind demodulation of the control signal area in the predetermined subcarrier by using pilot signals one by one.

Next, the signal reception unit 201 of the user apparatus UE demodulates the user data area by using the pilot signal used for correctly demodulating the control signal.

The above-described processing steps will be specifically described while making reference to FIG. 7. For example, in FIG. 7, resources of the blocks "1", "3", "5", and "7" in the control signal area are mapped to the same subcarrier. Similarly, resources of the blocks "2", "4", "6", and "8" in the control signal area are mapped to the same subcarrier.

For example, the signal reception unit 201 of the user apparatus UE tries to perform the blind demodulation of the resources of the subcarrier corresponding to the blocks "1", "3", "5", and "7" in the control signal area by using a channel estimate value obtained from a pilot signal mapped to the resource of the block "1". In the case where the demodulation is not successfully performed, the signal reception unit 201 of the user apparatus UE tries to perform the blind demodulation by using a channel estimate value obtained from a pilot signal mapped to the resource of the block "3". In the case where the demodulation is not successfully performed yet, the signal reception unit 201 of the user apparatus UE tries to perform the blind demodulation by using a channel estimate value obtained from a pilot signal mapped to the resource of the block "5". In the case where the demodulation is not successfully performed yet, the signal reception unit 201 of the user apparatus UE tries to perform the blind demodulation by using a channel estimate value obtained from a pilot signal mapped to the resource of the block "7". As described above, the signal reception unit 201 of the user apparatus UE repeatedly performs the blind demodulation, and obtains the control signal from the successfully demodulated resource. Next, the signal reception unit 201 of the user apparatus UE performs demodulation processing for the user data area by using a channel estimate value of the pilot signal that is used for the successful demodulation. For example, in the case where the control signal has been successfully demodulated by using a channel estimate value obtained from a pilot signal mapped to the resource of the block "3", the signal reception unit 201 of the user apparatus UE performs demodulation processing for the user data area by using the channel estimate value.

It should be noted that, as illustrated in FIG. 7, in the pilot signal area, the same pilot signal is repeatedly included multiple times in the frequency domain. Therefore, in the case where the signal reception unit 201 of the user apparatus UE performs the blind demodulation of the control signal area and the user data area, the signal reception unit 201 of the user apparatus UE may try to perform the blind demodulation by using a channel estimate value obtained from a pilot signal of a subcarrier whose frequency is close to the subcarrier which the signal reception unit 201 is going to demodulate.

As described above, the wireless frame structure, the multiplexing structure, and the demodulation processing have been described. With the above wireless frame structure and the multiplexing structure, in the case where communications are performed by using multiple beams by using massive MIMO, it is possible for a wireless communication system according to an embodiment to multiplex pilot signals and control signals into a wireless signal that is transmitted by using a lot of antenna ports (a lot of beams).

It should be noted that the pilot signal allocation method (association method), illustrated in FIG. 7 and used for demodulation of the control signals and the user data, is only an example. Other association methods may be used.

(Regarding Multiple Use Area)

Figure 8:
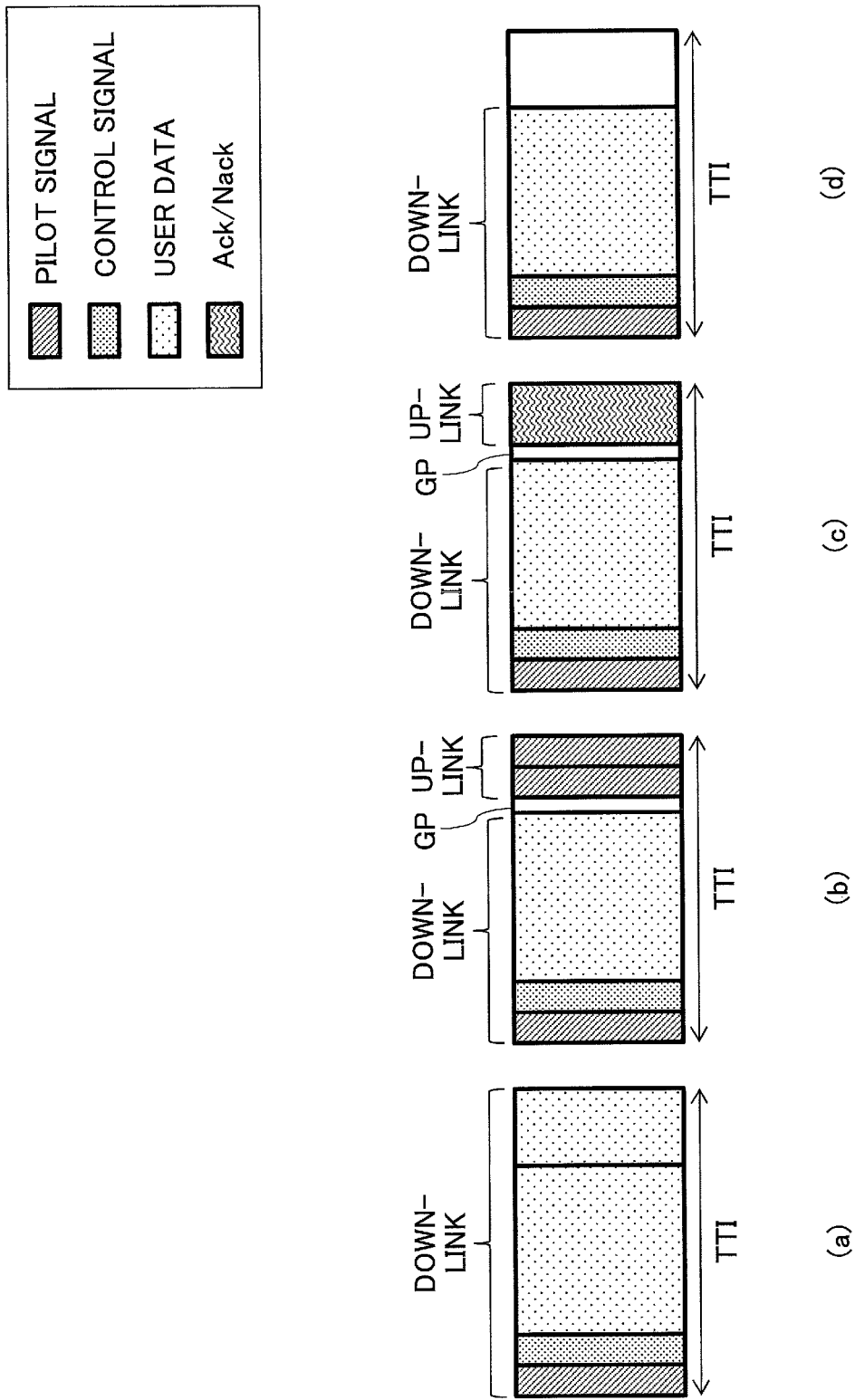
FIG. 8 is a drawing illustrating a structure example of a multiple use area.

FIG. 8 is a drawing illustrating a structure example of a multiple use area. As illustrated in FIG. 8, signals for various usages including an uplink signal can be allocated (assigned) to the multiple use area. It should be noted that which usage signal is allocated to the multiple use area is determined by the wireless frame control unit 103 of the base station eNB, and the determined result is transmitted to the user apparatus UE by using the use information included in the control signal. The control signal processing unit 203 of the user apparatus UE obtains a type and contents of a wireless signal that is mapped (or, is to be mapped) to the multiple use area within the same subframe based on the use information included in the received control signal.

FIG. 8 (*a*) illustrates a structure in a case where additional user data is allocated to the multiple use area. In this case, the use information includes information indicating that additional user data is allocated to the multiple use area. It should be noted that the use information may further include information indicating the CP length of an OFDM symbol in the multiple use area. The information indicating the CP length of the OFDM symbol may be a bit of information indicating whether the CP length is long or short.

In the case of FIG. 8 (*a*), the user data processing unit 204 of the user apparatus UE obtains from the multiple use area user data for the user apparatus UE based on scheduling information included in the control information.

It should be noted that, in FIG. 8 (*a*), an additional downlink pilot signal (reference signal) may be allocated to the multiple use area. The additional pilot signal may be, for example, a CSI-RS (Channel State Information-Reference Signal), or other pilot signals (reference signals). In this case, the use information may include information indicating that an additional pilot signal is allocated to the multiple use area. Further, the use information may include information indicating the number and the kind (CSI-RS, etc.) of additional pilot signals. In this case, the signal reception unit 201 of the user apparatus UE receives the additional downlink pilot signal, and performs predetermined processing.

FIG. 8 (*b*) illustrates a structure in a case where an uplink pilot signal is allocated to the multiple use area. The uplink pilot signal may be, for example, an SRS (Sounding Reference Signal) or a DM-RS (Demodulation Reference Signal). Further, the uplink pilot signal may be other pilot signals (reference signals). In this case, the use information includes information indicating that an uplink pilot signal is allocated to the multiple use area, and information indicating that a guard period (GP) should be set at the beginning of the multiple use area. It should be noted that the use information may further include information for specifying the length of the guard period (GP). Further, the use information may include information indicating the number and the kind (SRS, DM-RS, etc.) of the uplink pilot signals to be transmitted. An example of FIG. 8 (*b*) illustrates a structure in which two kinds of pilot signals are allocated.

In the case of FIG. 8 (*b*), the transmission signal generation unit 206 and the signal transmission unit 202 of the user apparatus UE transmit to the base station eNB an uplink pilot signal by using resources of the multiple use area based on the use information.

FIG. 8 (*c*) illustrates a structure in a case where an HARQ ACK/NACK is allocated to the multiple use area. In this case, the use information includes information indicating that an HARQ ACK/NACK is allocated to the multiple use area, and information indicating that a guard period (GP) should be set at the beginning of the multiple use area. It should be noted that the use information may further include information for specifying the length of the guard period (GP). Further, the use information may include information indicating a timing at which the ACK/NACK is to be transmitted, or, may further include a subcarrier position to which the ACK/NACK is mapped. Further, the use information may include information for causing the user apparatus UE to hold transmission of the ACK/NACK to the base station eNB. Regarding the transmission-held ACK/NACK, the transmission timing from the user apparatus UE to the base station eNB may be indicated by using a downlink control signal transmitted from the base station eNB at another timing, or may be indicated by another method.

Further, multiple ACK/NACKs may be mapped to the multiple use area. For example, in the case where user data is transmitted by using 2×2 MIMO, it is necessary for the user apparatus UE to transmit two ACK/NACKs to the base station eNB. Further, a case is expected in which it is desirable that ACK/NACKs of multiple user data sets to be transmitted separately via different subcarriers are transmitted together via a specific subcarrier. Therefore, the wireless frame control unit 103 of the base station eNB may include, in the use information, information indicating that multiple ACK/NACKs are multiplexed into a specific subcarrier by using Code Division Multiplexing (CDM), and transmit the included result to the user apparatus UE. Further, the wireless frame control unit 103 of the base station eNB may include in the use information information indicating that a corresponding number of subcarriers are allocated to the number of ACK/NACKs, and transmit the included result to the user apparatus UE.

In the case of FIG. 8 (*c*), the HARQ processing unit 205 and the signal transmission unit 202 of the user apparatus UE transmit to the base station eNB an ACK/NACK by using resources of the multiple use area indicated by the use information.

FIG. 8 (*d*) illustrates a structure in a case where the multiple use area is set as an unused area. In this case, the use information includes information indicating that the multiple use area is an unused area. Here, the unused area means an area not used for a certain user apparatus UE. In other words, there may be a case in which user data for another user apparatus UE is transmitted from the base station eNB, or a case in which another user apparatus UE transmits an uplink signal, in the unused area. In the case where the use information includes information indicating that the multiple use area is an unused area, the transmission signal generation unit 206 and the signal transmission unit 202 of the user apparatus UE do not transmit an uplink signal in the multiple use area.

(Regarding HARQ ACK/NACK)

Next, HARQ control performed by a wireless communication system according to an embodiment will be described. As illustrated in FIG. 8 (*c*), the wireless frame control unit 103 of the base station eNB includes in the use information indicating resources to which HARQ ACK/NACKs are mapped. In other words, different from the conventional LTE, it is possible for the base station eNB to control resources to which ACK/NACKs are mapped in various ways for each subframe.

Figure 9:
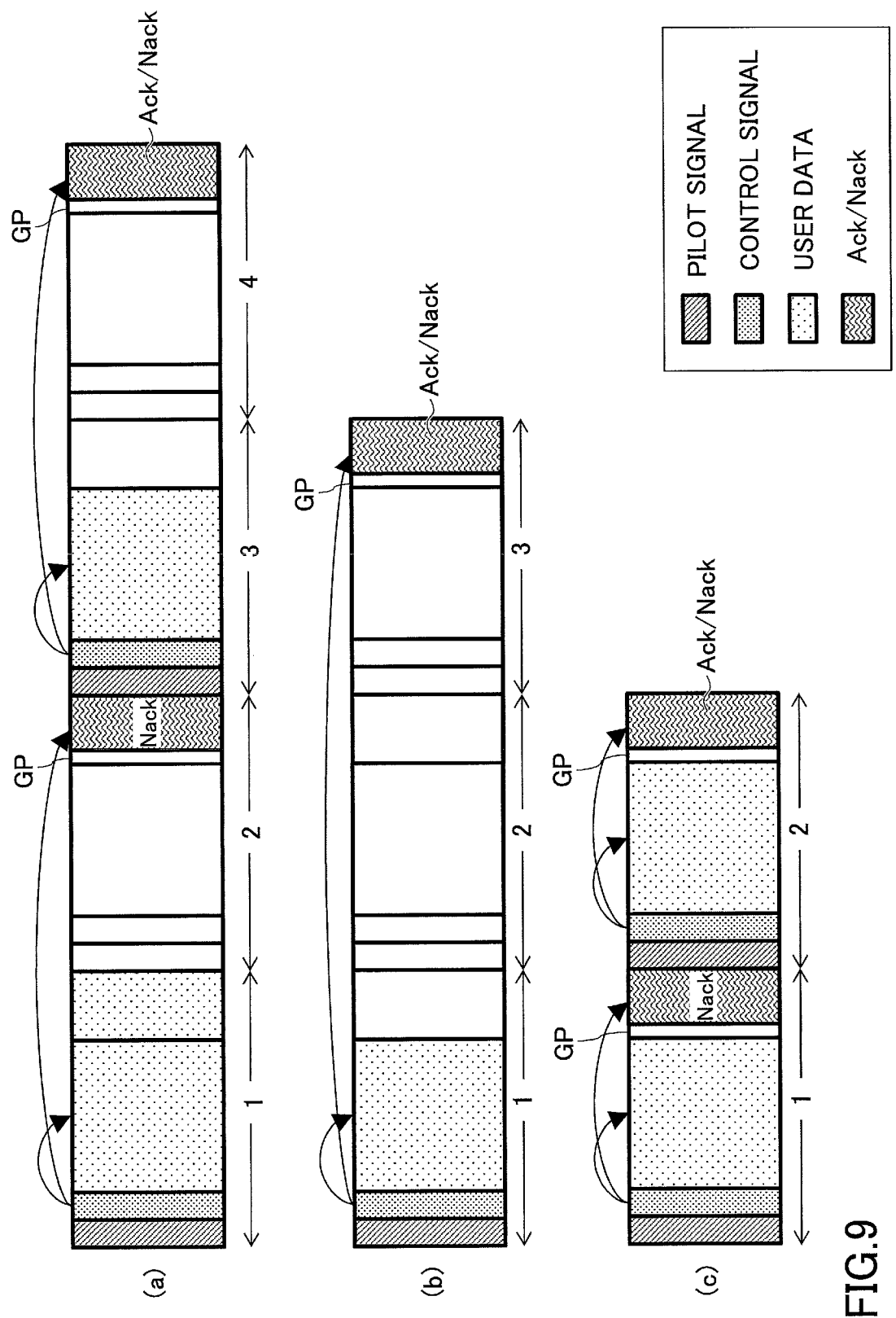
FIG. 9 is a drawing illustrating an example of an ACK/NACK mapping method (in the time axis direction).

FIG. 9 is a drawing illustrating an example of an ACK/NACK mapping method (in the time axis direction). It should be noted that each section corresponds to a subframe (1 TTI) in FIG. 9. Further, the numbers (1-4) are given to the sections for the sake of convenience in order to distinguish between the subframes in FIG. 9.

FIG. 9 (*a*) illustrates a signal mapping example in a case where the wireless frame control unit 103 of the base station eNB transmits to the user apparatus UE use information indicating that the user apparatus UE should transmit an ACK/NACK for the user data transmitted via a predetermined subframe (subframe 1 in FIG. 9 (*a*)) by using a subframe after 1 TTI (subframe 2 in FIG. 9 (*a*)). Further, FIG. 9 (*a*) illustrates a signal mapping example in a case where the wireless frame control unit 102 of the base station eNB retransmits the user data via a subframe subsequent to the subframe via which the NACK has been received (subframe 3 in FIG. 9 (*a*)), and transmits use information indicating that the user apparatus UE should transmit an ACK/NACK for the retransmitted user data by using a subframe after 1 TTI (subframe 4 in FIG. 9 (*a*)).

FIG. 9 (*b*) illustrates a signal mapping example in a case where the wireless frame control unit 103 of the base station eNB transmits to the user apparatus UE use information indicating that the user apparatus UE should transmit an ACK/NACK for the user data transmitted via a predetermined subframe (subframe 1 in FIG. 9 (*b*)) by using a subframe after 2 TTIs (subframe 3 in FIG. 9 (*b*)).

FIG. 9 (*c*) illustrates a signal mapping example in a case where the wireless frame control unit 103 of the base station eNB transmits to the user apparatus UE use information indicating that the user apparatus UE should transmit an ACK/NACK for the user data transmitted via a predetermined subframe (subframe 1 or 2 in FIG. 9 (*c*)) within the same subframe. Further, in FIG. 9 (*c*), the signal transmission unit 102 of the base station eNB retransmits the user data by using a subframe subsequent to the subframe via which a NACK has been received (subframe 2 in FIG. 9 (*c*)).

It is possible to perform fast HARQ control by using the mapping method illustrated in FIG. 9 (*c*), and it is possible to provide a low latency wireless signal. Further, for the data that does not receive a lot of influence from delay, it is possible to allocate more resources to other user apparatuses UE by using the mapping method illustrated in FIG. 9 (*a*) or FIG. 9 (*b*).

Figure 10:
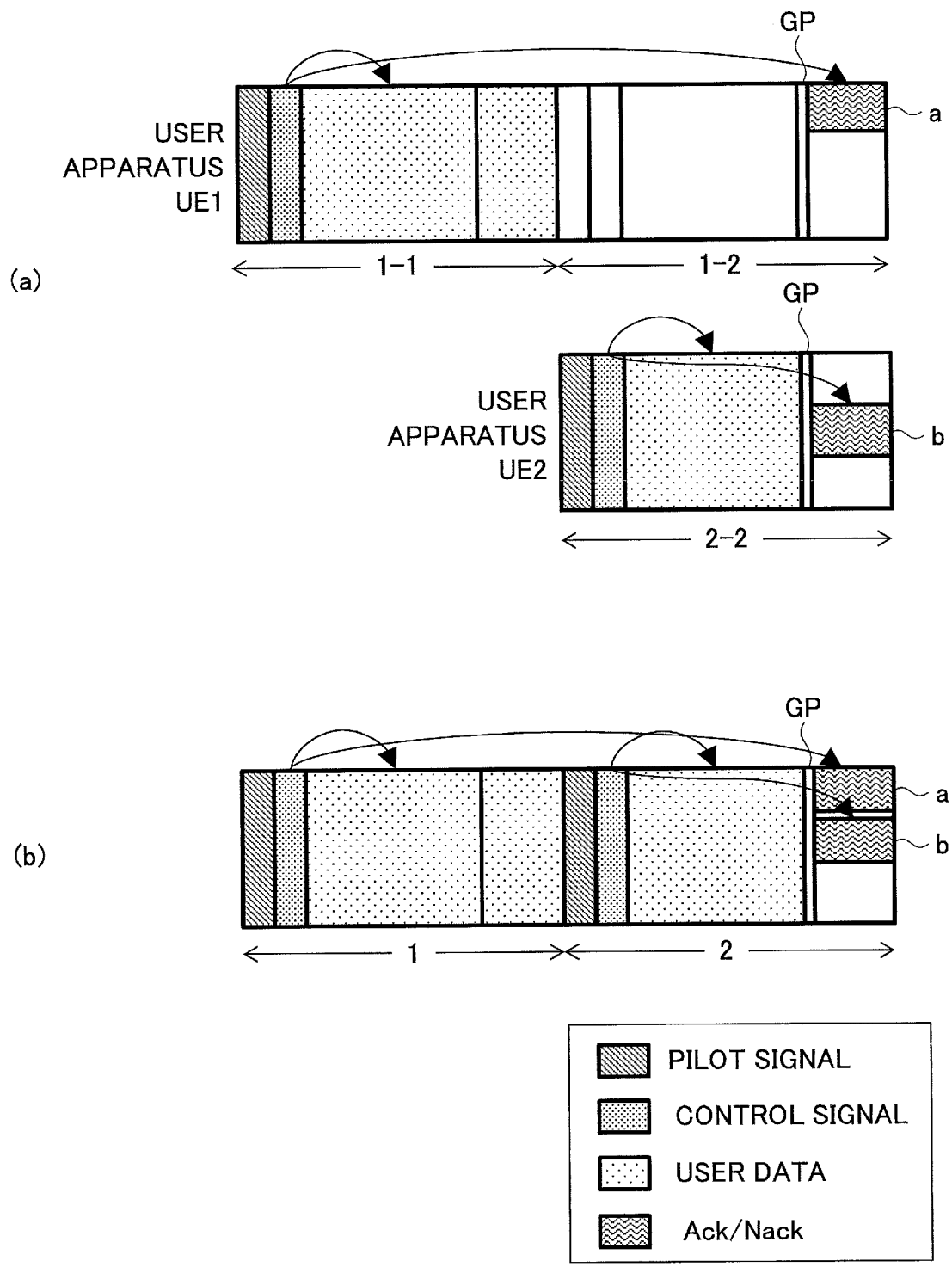
FIG. 10 is a drawing illustrating an example of an ACK/NACK mapping method (in the frequency direction).

FIG. 10 is a drawing illustrating an example of an ACK/NACK mapping method (in the frequency direction).

It should be noted that each section corresponds to a subframe (1 TTI) in FIG. 10. Further, the numbers (1-1, 1-2, 2-2, 1, 2) are given to the sections for the sake of convenience in order to distinguish between the subframes in FIG. 10. Further, a user apparatus UE1 and a user apparatus UE2 indicate different user apparatuses UE.

FIG. 10 (a) illustrates a signal mapping example in a case where the wireless frame control unit 103 of the base station eNB transmits to the user apparatus UE1 use information indicating that the user apparatus UE1 should transmit an ACK/NACK for the user data transmitted via a predetermined subframe (subframe 1-1 in FIG. 10 (a)) by using a subframe after 1 TTI (subframe 1-2 in FIG. 10 (a)) and a predetermined subcarrier of the subframe (subcarrier a in FIG. 10 (a)). Further, FIG. 10 (a) illustrates a signal mapping example in a case where the wireless frame control unit 103 of the base station eNB transmits to the user apparatus UE2 use information indicating that the user apparatus UE2 should transmit an ACK/NACK for the user data transmitted via a predetermined subframe (subframe 2-2 in FIG. 10 (a)) by using the same subframe and a predetermined subcarrier of the subframe (subcarrier b in FIG. 10 (a)).

In the example of FIG. 10 (a), in an uplink signal, ACK/NACKs transmitted by the user apparatus UE1 and the user apparatus UE2 are multiplexed (orthogonalized) in the frequency direction. It should be noted that, although the ACK/NACKs transmitted by the user apparatus UE1 and the user apparatus UE2 are multiplexed by using different subcarriers in the example of FIG. 10 (a), the ACK/NACKs may be multiplexed in the same subcarrier by using different spreading codes.

FIG. 10 (b) illustrates a signal mapping example in a case where the wireless frame control unit 103 of the base station eNB transmits to the user apparatus UE use information indicating that the user apparatus UE should transmit an ACK/NACK for the user data transmitted via a predetermined subframe (subframe 1 in FIG. 10 (b)) by using a subframe after 1 TTI (subframe 2 in FIG. 10 (b)) and a predetermined subcarrier of the subframe (subcarrier a in FIG. 10 (b)). Further, FIG. 10 (b) illustrates a signal mapping example in a case where the wireless frame control unit 103 of the base station eNB transmits to the user apparatus UE use information indicating that the user apparatus UE should transmit an ACK/NACK for the user data transmitted via a predetermined subframe (subframe 2 in FIG. 10 (b)) by using the same subframe and a predetermined subcarrier of the subframe (subcarrier b in FIG. 10 (b)).

By having the ACK/NACKs mapped as illustrated in FIG. 10 (b), it is not necessary to allocate resources for an ACK/NACK in each subframe, and it is possible to reduce overhead due to HARQ control.

<Effect>

As described above, a user apparatus according to an embodiment is provided. The user apparatus performs communications with a base station. The user apparatus includes a receiving unit configured to receive a downlink pilot signal, a downlink control signal, and downlink user data according to a subframe that includes a pilot signal area, to which the downlink pilot signal is mapped, a control signal area, to which the downlink control signal is mapped, a user data area, to which the downlink user data is mapped, and a multiple use area, to which an uplink signal or a downlink signal is mapped; and a transmission unit configured to map the uplink signal to the multiple use area and transmit the mapped result to the base station in the case where information is included in the downlink control signal indicating that the uplink signal is to be mapped to the multiple use area. With the above user apparatus UE, a technology is provided in which it is possible to flexibly change the wireless frame structure within the same subframe.

Further, in the case where information, indicating that the multiple use area is an area to which an additional downlink signal is mapped, is included in the downlink control signal, the reception unit may receive the additional downlink signal that is mapped to the multiple use area, and, in the case where information, indicating that no signal is mapped to the multiple user area, is included in the downlink control signal, the transmission unit may not transmit to the base station an uplink signal in the multiple use area. With the above arrangement, it is possible for the user apparatus UE to receive an additional downlink signal mapped to the multiple use area. Further, with the above arrangement, in the case where a downlink signal for another user apparatus UE is transmitted to the base station eNB, and/or, in the case where an uplink signal is transmitted by another user apparatus UE, it is possible for the user apparatus UE to avoid giving unnecessary interference to those signals.

Further, in the case where an uplink signal is mapped to the multiple use area, the transmission unit may include an HARQ-control response signal in the uplink signal and transmit the included result to the base station. With the above arrangement, it is possible for the user apparatus UE to transmit an ACK/NACK to the base station eNB flexibly.

Further, the downlink control signal may include information indicating a transmission timing of the HARQ control response signal or a position of a subcarrier to be transmitted, and the transmission unit may include the HARQ control response signal in the uplink signal at the indicated transmission timing or at the position of the subcarrier to be transmitted, and transmit the included result to the base station. With the above arrangement, it is possible for the base station eNB to transmit to the user apparatus UE an indication indicating a transmission timing of an HARQ ACK/NACK flexibly. Further, it is possible to perform fast HARQ control as necessary, and it is possible to provide a further lower latency wireless signal.

Further, in the case where an uplink signal is mapped to the multiple use area, the transmission unit may include an uplink reference signal in the uplink signal and transmit the included result to the base station. With the above arrangement, for example, it is possible for the user apparatus UE to quickly transmit a reference signal such as an SRS by using the multiple use area, and, it is possible to accelerate quality measurement processing, uplink scheduling processing, etc., performed by the base station eNB.

Further, regarding the subframes, the length of a cyclic prefix set in both of, or any one of, the pilot signal area and the control signal area, may be greater than the length of a cyclic prefix set in the user data area. With the above arrangement, it is possible for the user apparatus UE to receive the pilot signal and the control signal stably.

Further, a pilot signal that is mapped to a predetermined subcarrier in the pilot signal area may be associated with a control signal that is mapped to a predetermined subcarrier in the control signal area in advance, and, in the case of demodulating the control signal mapped to the predetermined subcarrier, the reception unit may demodulate the control signal by using the pilot signal mapped to the subcarrier corresponding to the control signal. With the above arrangement, in the case of performing communications according to massive MIMO, it is possible for the base station eNB to multiplex pilot signals and control signals transmitted by using a lot of antenna ports (a lot of beams) into a wireless signal, and to transmit the multiplexed result to the user apparatus UE. Further, it is possible for the user apparatus UE to accurately demodulate the control signal and the user data that are mapped to predetermined antenna ports (predetermined beams).

Further, with the above arrangement, it is possible for the user apparatus UE to perform demodulation processing according to a rough reception timing synchronization in the case of demodulation of the pilot signal area and the control signal area, and to perform demodulation processing after performing accurate reception timing synchronization by using the received pilot signal in the case of demodulation of the user data area. Further, even in the case where the beams used for communications or the base stations eNB (site) that transmit the beams are switched, it is possible for the user apparatus UE to immediately perform synchronization by using the pilot signal at the beginning of a wireless frame (subframe) of the beam after the switching, and to demodulate resources of the user data area by using a more accurate synchronization timing when demodulating the user data area.

The reception unit may receive multiple subframes with different TTI lengths in the frequency domain. With the above arrangement, it is possible for the base station eNB to transmit a signal to the user apparatus UE by using a wireless frame with short TTI for low-latency required communications. Further, it is possible for the base station eNB to transmit a signal to the user apparatus UE by using a wireless frame with long TTI for coverage required communications.

Further, a base station according to an embodiment is provided. The base station performs communications with a user apparatus. The base station includes a control unit configured to control which of a downlink signal and an uplink signal is to be mapped to a multiple use area to which the uplink signal or the downlink signal is mapped; and a transmission unit configured to transmit a downlink pilot signal, a downlink control signal, and downlink user data by using a subframe that includes a pilot signal area, to which the downlink pilot signal is mapped, a control signal area, to which the downlink control signal is mapped, a user data area, to which the downlink user data is mapped, and the multiple use area, in the case where the uplink signal is mapped to the multiple use area. With the above base station eNB, a technology is provided in which it is possible to flexibly change the wireless frame structure within the same subframe.

Further, in the case where a downlink signal is mapped to the multiple use area, the transmission unit may have user data or a downlink reference signal mapped to the multiple use area, and transmit the mapped result to the user apparatus. With the above arrangement, it is possible for the base station eNB to transmit more data to the user apparatus UE as necessary. Further, with the above arrangement, it is possible for the base station eNB to transmit to the user apparatus UE a pilot signal (reference signal) different from the pilot signal that is mapped to the pilot signal area.

Further, the "unit" included in each of the above apparatuses may be substituted for with "means", "circuit", "device", etc.

<Supplementary Description of Embodiment>

The apparatuses (user apparatus/base station) according to an embodiment may include a CPU and a memory, may be realized by having a program executed by the CPU (processor), may be realized by hardware such as hardware circuitry in which the logic described in an embodiment is included, or may be realized by a mixture of a program and hardware.

As described above, embodiments have been described. The disclosed invention is not limited to these embodiments, and a person skilled in the art would understand various variations, modifications, replacements, or the like. Specific examples of numerical values have been used for encouraging understanding of the present invention. These numeric values are merely examples and, unless otherwise noted, any appropriate values may be used. In the above description, partitioning of items is not essential to the present invention. Matters described in more than two items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described sequences and flowcharts according to an embodiment may be changed as long as there is no contradiction. For the sake of description convenience, the base station eNB and the user apparatus UE have been described by using functional block diagrams. These apparatuses may be implemented by hardware, by software, or by combination of both. The software which is executed by a processor included in a user apparatus UE according to an embodiment and the software which is executed by a processor included in a base station eNB may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

The present invention is not limited to the above embodiments and various variations, modifications, alternatives, replacements, etc., may be included in the present invention without departing from the spirit of the invention.

It should be noted that, according to an embodiment, the signal reception unit 201 and/or the control signal processing unit 203 are examples of a reception unit. The signal transmission unit 202 and/or the transmission signal generation unit 206 are examples of a transmission unit. The wireless frame control unit 103 is an example of a control unit. The signal transmission unit 102 is an example of a transmission unit.

The present application is based on and claims the benefit of priority of Japanese Priority Application No. 2015-092374 filed on Apr. 28, 2015, the entire contents of which are hereby incorporated by reference.

DESCRIPTION OF THE REFERENCE NUMERALS

UE User apparatus
eNB Base station
101 Signal reception unit
102 Signal transmission unit
103 Wireless frame control unit
201 Signal reception unit
202 Signal transmission unit
203 control signal processing unit
204 User data processing unit
205 HARQ processing unit
206 Transmission signal generation unit
301 RF module
302 BB module
303 Apparatus control module 304 Communication IF
401 RF module
402 BB module
403 UE control module

What is claimed is:

1. A terminal comprising:
a receiver configured to receive a downlink signal by using symbols included in a region, to which the downlink signal is mapped, and symbols included in a multiple use region, to which an uplink signal or a downlink signal is mapped; and
a transmitter configured to map the uplink signal to the multiple use region and transmit the mapped result to a base station in a case where information, indicating that the uplink signal is to be mapped to the multiple use region, is transmitted from the base station,
wherein the information is included in a downlink control signal for scheduling of the uplink signal or the downlink signal,
wherein the symbols included in a region, to which the downlink signal is mapped, and the symbols included in the multiple use region, are arranged in a time axis direction within a time unit corresponding to the downlink control signal, and
wherein upon receiving the information indicating that the uplink signal is to be mapped to the multiple use region, the transmitter includes a Sounding Reference Signal (SRS) in the uplink signal and transmits the included result to the base station in a case where the uplink signal is mapped to the multiple use region.

2. The terminal according to claim 1, wherein the region and the multiple use region are included in a TTI.

3. The terminal according to claim 2, wherein
the receiver receives an additional downlink signal that is mapped to the multiple use region in a case where information, indicating that the additional downlink signal is to be mapped to the multiple use region, is transmitted from the base station, and
the transmitter does not transmit to the base station the uplink signal in the multiple use region in a case where information, indicating that no signal is mapped to the multiple use region, is transmitted from the base station.

4. The terminal according to claim 2, wherein
the transmitter includes a response signal according to HARQ control in the uplink signal and transmits the included result to the base station in a case where the uplink signal is mapped to the multiple use region.

5. The terminal according to claim 1, wherein
the receiver receives an additional downlink signal that is mapped to the multiple use region in a case where information, indicating that the additional downlink signal is to be mapped to the multiple use region, is transmitted from the base station, and
the transmitter does not transmit to the base station the uplink signal in the multiple use region in a case where information, indicating that no signal is mapped to the multiple use region, is transmitted from the base station.

6. The terminal according to claim 5, wherein
the transmitter includes a response signal according to HARQ control in the uplink signal and transmits the included result to the base station in a case where the uplink signal is mapped to the multiple use region.

7. The terminal according to claim 1, wherein
the transmitter includes a response signal according to HARQ control in the uplink signal and transmits the included result to the base station in a case where the uplink signal is mapped to the multiple use region.

8. The terminal according to claim 7, wherein,
the downlink signal includes information indicating a transmission timing of the response signal according to the HARQ control, or a position of a transmission subcarrier, and
the transmitter includes the response signal according to the HARQ control in the uplink signal at the indicated transmission timing or at the position of the transmission subcarrier, and transmits the included result to the base station.

9. A base station comprising:
a transmitter configured to transmit a downlink signal by using symbols included in a region, to which the downlink signal is mapped, and symbols included in a multiple use region to which an uplink signal or a downlink signal is mapped; and
a receiver configured to receive a signal in which the uplink signal is mapped to the multiple user region from a terminal in a case where information, indicating that the uplink signal is to be mapped to the multiple user region, is transmitted to the terminal,
wherein the information is included in a downlink control signal for scheduling of the uplink signal or the downlink signal,
wherein the symbols included in a region, to which the downlink signal is mapped, and the symbols included in the multiple use region, are arranged in a time axis direction within a time unit corresponding to the downlink control signal, and
wherein upon transmitting the information indicating that the uplink signal is to be mapped to the multiple use region, the receiver receives a Sounding Reference Signal (SRS) in the uplink signal and receives the included result from the terminal in a case where the uplink signal is mapped to the multiple use region.

10. The base station according to claim 9, wherein
in a case where the downlink signal is to be mapped to the multiple use region, the transmitter maps user data or a downlink reference signal to the multiple use region, and transmits the mapped result to the terminal.

* * * * *